(12) United States Patent
Shin et al.

(10) Patent No.: US 11,679,643 B2
(45) Date of Patent: Jun. 20, 2023

(54) HVAC SYSTEM OF VEHICLE

(71) Applicants: Hyundai Motor Company, Seoul (KR); Kia Motors Corporation, Seoul (KR)

(72) Inventors: Gee Young Shin, Gyeonggi-do (KR); Dae Ig Jung, Gyeonggi-do (KR); Seung Hyeok Chang, Gyeonggi-do (KR); Dong Ho Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 836 days.

(21) Appl. No.: 16/682,145

(22) Filed: Nov. 13, 2019

(65) Prior Publication Data
US 2021/0023909 A1 Jan. 28, 2021

(30) Foreign Application Priority Data
Jul. 24, 2019 (KR) .................. 10-2019-0089883

(51) Int. Cl.
*B60H 1/00* (2006.01)
*G01K 13/02* (2021.01)

(52) U.S. Cl.
CPC ..... *B60H 1/00642* (2013.01); *B60H 1/00007* (2013.01); *B60H 1/00321* (2013.01); *G01K 13/02* (2013.01); *G01K 2201/02* (2013.01)

(58) Field of Classification Search
CPC .............. B60H 1/00278; B60H 1/00064; B60H 1/143; B60H 1/00921; B60H 1/32281; B60H 1/32284; B60H 1/323; B60H 2001/00121; B60H 2001/00135; B60H 2001/00949
See application file for complete search history.

(56) References Cited

U.S. PATENT DOCUMENTS

| | | | | |
|---|---|---|---|---|
| 4,350,020 A | * | 9/1982 | Rojey | F24F 12/003 62/93 |
| 5,390,508 A | * | 2/1995 | Benedict | B60H 1/00057 62/325 |
| 5,899,086 A | * | 5/1999 | Noda | B60H 1/323 62/238.7 |
| 5,934,988 A | * | 8/1999 | Fischer | B60H 1/00028 454/121 |
| 6,230,506 B1 | * | 5/2001 | Nishida | B60H 1/3213 62/211 |
| 6,715,307 B2 | * | 4/2004 | Hatakeyama | B60H 1/00007 162/42 |
| 6,755,046 B2 | * | 6/2004 | Nishida | F25B 13/00 62/239 |

(Continued)

FOREIGN PATENT DOCUMENTS

JP 59084615 A * 5/1984
KR 20140077064 A 6/2014

*Primary Examiner* — Nelson J Nieves
(74) *Attorney, Agent, or Firm* — Fox Rothschild LLP (57) ABSTRACT

A heating, ventilating, and air conditioning (HVAC) system of a vehicle is provided. The system replaces a cooling water circuit having a complex configuration and a separate heat pump system for recovering waste heat of an electric vehicle by changing an air flow path for supplying heating and cooling air and secures an indoor space by disposing an HVAC in an engine room.

13 Claims, 9 Drawing Sheets

(56) References Cited

U.S. PATENT DOCUMENTS

| | | | |
|---|---|---|---|
| 7,152,417 B2* | 12/2006 | Morishita | B60L 58/26 62/186 |
| 8,613,200 B2* | 12/2013 | LaGrandeur | B60H 1/00478 165/41 |
| 9,649,908 B2* | 5/2017 | Takeuchi | B60L 1/003 |
| 10,544,948 B2* | 1/2020 | Kwon | F24F 11/0008 |
| 2001/0003311 A1* | 6/2001 | Karl | F25B 41/20 62/196.4 |
| 2012/0304674 A1* | 12/2012 | Schwarzkopf | B60H 1/00878 62/238.1 |
| 2013/0299129 A1* | 11/2013 | Osaka | B60H 1/0005 165/59 |
| 2014/0230480 A1* | 8/2014 | Sakai | B01D 53/265 62/271 |
| 2015/0082820 A1* | 3/2015 | Takahashi | B60H 1/0005 62/238.7 |
| 2016/0229266 A1* | 8/2016 | Maeda | B60H 1/0005 |
| 2017/0166031 A1* | 6/2017 | Shin | B60H 1/00921 |
| 2017/0167776 A1* | 6/2017 | Shin | F25B 13/00 |
| 2018/0065444 A1* | 3/2018 | Allgaeuer | B60H 1/00899 |
| 2018/0093548 A1* | 4/2018 | Ceperkovic | B60H 1/00921 |
| 2018/0312028 A1* | 11/2018 | Rippel | B60H 1/00464 |
| 2018/0319254 A1* | 11/2018 | Hötzel | B60H 1/039 |
| 2018/0370330 A1* | 12/2018 | Vespa | B60H 1/034 |
| 2019/0047361 A1* | 2/2019 | Lee | B60H 1/00278 |
| 2019/0168567 A1* | 6/2019 | Schmitt | B60H 1/00335 |
| 2019/0168579 A1* | 6/2019 | Kim | B60H 1/00057 |
| 2020/0055372 A1* | 2/2020 | Urakawa | B60H 1/00742 |
| 2020/0189357 A1* | 6/2020 | Chopard | B60H 1/32281 |
| 2020/0398641 A1* | 12/2020 | Kim | B60H 1/00899 |
| 2020/0398645 A1* | 12/2020 | He | F25B 41/26 |
| 2021/0016629 A1* | 1/2021 | Miyakoshi | B60H 1/32 |
| 2021/0300155 A1* | 9/2021 | Kanou | B60H 1/00849 |

* cited by examiner

HVAC SYSTEM OF VEHICLE

CROSS REFERENCE TO RELATED APPLICATION

The present application claims priority of Korean Patent Application No. 10-2019-0089883 filed on Jul. 24, 2019, the entire contents of which is incorporated herein for all purposes by this reference.

BACKGROUND

Field of the Invention

The present invention relates to a heating, ventilating, and air conditioning (HVAC) system of a vehicle, which is capable of efficiently managing energy required for indoor HVAC and cooling and heating of a battery to extend a travel distance of the vehicle.

Description of the Related Art

Recently, electric vehicles have been developed to implement eco-friendly technologies and solve problems such as energy depletion and the like. The electric vehicles operate using motors which receive electricity from batteries and output power. Accordingly, the electric vehicles have advantages of omitting emission of carbon dioxide, reducing noise, and having energy efficiencies of the motors are that are higher than those of engines.

Core techniques in implementing the electric vehicles are technologies relating to battery modules. Recently, research is being actively conducting regarding a battery in weight reduction, miniaturization, and a short charging time. The battery module should be used in an optimal temperature environment to maintain optimal performance and a long lifespan. However, owing to heat generated during operation and a variation in external temperature changes, it is difficult for the battery module to be used in an optimal temperature environment.

Further, since the electric vehicles do not have a waste heat source that is generated during combustion in a separate engine like an internal combustion engine, the electric vehicles perform vehicle indoor heating with electric heating devices in the winter. In addition, since a warm up is required to improve charging and discharging performance of a battery during cold weather, separate cooling-water heating type electric heaters are provided and used in the electric vehicles. In other words, to maintain the optimal temperature environment of the battery module, a technology for separately operating a cooling and heating system for adjusting a temperature of the battery module from a cooling and heating system for indoor HVAC of the electric vehicle is adopted.

In other words, two independent cooling and heating systems are provided and thus one of the two independent cooling and heating systems is used for indoor cooling and heating, and the other thereof is used for adjusting the temperature of the battery module. However, when the two independent cooling and heating systems are operated as described above, energy is not efficiently managed and thus, a travel distance of the electric vehicle is short and the vehicle is unable travel a long distance.

The foregoing is intended merely to aid in the understanding of the background of the present invention, and is not intended to mean that the present invention falls within the purview of the related art that is already known to those skilled in the art.

SUMMARY

Accordingly, the present invention provides a heating, ventilating, and air conditioning (HVAC) system of a vehicle, which is capable of replacing a cooling water circuit having a complex configuration and a separate heat pump system for recovering waste heat of an electric vehicle by changing an air flow path for supplying heating and cooling air and is capable of securing an indoor space by disposing an HVAC in an engine room. Therefore, the present invention provides the HVAC system of a vehicle, which is capable of preventing a production cost and a weight from being excessive by avoiding a complex cooling line and minimizing a valve configuration.

According to one aspect, a heating, ventilating, and air conditioning (HVAC) system of a vehicle may include a refrigerant line having an evaporator, a compressor, and a condenser and through which a refrigerant may circulate, an indoor HVAC device in which the evaporator and the condenser are disposed on an internal air flow path, and air passing through the evaporator or the condenser may be discharged to an interior or an exterior of the vehicle through operation of a door, a first heat exchanger disposed adjacent to the condenser on the internal air flow path of the indoor HVAC device and provided to exchange heat with the condenser, a second heat exchanger disposed adjacent to the evaporator on the internal air flow path of the indoor HVAC device and provided to exchange heat with the evaporator, and a cooling water line configured to allow cooling water to circulate through the first heat exchanger and the second heat exchanger.

The indoor HVAC device may include a first air flow path in which the condenser and the first heat exchanger are disposed and a first door is provided and through which air increased in temperature while passing through the condenser circulates, and a second air flow path in which the evaporator and the second heat exchanger are disposed and a second door is provided and through which air cooled while passing through the evaporator circulates. The condenser and the first heat exchanger may be disposed in the first air flow path, and the evaporator and the second heat exchanger may be disposed in the second air flow path.

The condenser and first heat exchanger may be disposed to allow air passing through the first air flow path to pass through the condenser after the first heat exchanger and spaced apart from each other to allow convective heat transfer. The evaporator and second heat exchanger may be disposed to allow air passing through the second air flow path to pass through the evaporator after the second heat exchanger and spaced apart from each other to allow convective heat transfer. The condenser and first heat exchanger may be disposed to allow air passing through the first air flow path to pass through the condenser after the first heat exchanger and in contact with each other to allow conductive heat transfer. Additionally, the evaporator and second heat exchanger may be disposed to allow air passing through the second air flow path to pass through the evaporator after the second heat exchanger and in contact with each other to allow conductive heat transfer.

The condenser may be disposed in the first air flow path, the first heat exchanger may be configured to exchange heat with the condenser outside the first air flow path, the evaporator may be disposed inside the second air flow path, and the second heat exchanger may be configured to exchange heat with the evaporator outside the second air flow path. The condenser may be in contact with the first heat exchanger to allow conductive heat transfer, and the evaporator may be in contact with the second heat exchanger to allow conductive heat transfer.

A water heating heater may be further included in the cooling water line, and the HVAC system may further include a battery temperature rise line that branches from the cooling water line to the first heat exchanger and the second heat exchanger and including a third heat exchanger, a battery, and a first valve configured to switch a flow of the cooling water of the first heat exchanger or the second heat exchanger. The HVAC system may further include a battery cooling line that branches from the refrigerant line and connected to the third heat exchanger to exchange heat therewith and including a second valve configured to switch a flow of the refrigerant of the third heat exchanger.

The HVAC system may further include a controller configured to determine a temperature of the battery and information regarding a discharge temperature of indoor air and operate the water heating heater, the first valve, and the second valve based on an operation mode due to the temperature of the battery and the information regarding the discharge temperature of the indoor air. When a heating mode is performed, the controller may be configured to operate the water heating heater and close the first valve and the second valve.

When a battery temperature increase mode is performed, the controller may be configured to operate the water heating heater, open the first valve to allow the cooling water to move to the first heat exchanger and the second heat exchanger, and close the second valve. When a mild temperature increase mode, of which temperature is less than that of the battery temperature increase mode, is performed, the controller may be configured to operate the water heating heater, open the first valve to allow the cooling water to move to the second heat exchanger, and close the second valve.

When a cooling mode is performed, the controller may be configured to stop operation of the water heating heater and close the first valve and the second valve. Additionally, when a battery cooling mode is performed, the controller may be configured to stop operation of the water heating heater, open the first valve to allow the cooling water to move to the second heat exchanger, and open the second valve. Opening and closing of the first door and the second door may be adjusted by the controller, and, when a heating mode is performed, the controller may be configured to open the first door and close the second door, and, when a cooling mode is performed, the controller may be configured to close the first door and open the second door.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a heating, ventilating, and air conditioning (HVAC) system of a vehicle according to exemplary embodiments of the present invention will be described with reference to the accompanying drawings.

Figure 1:
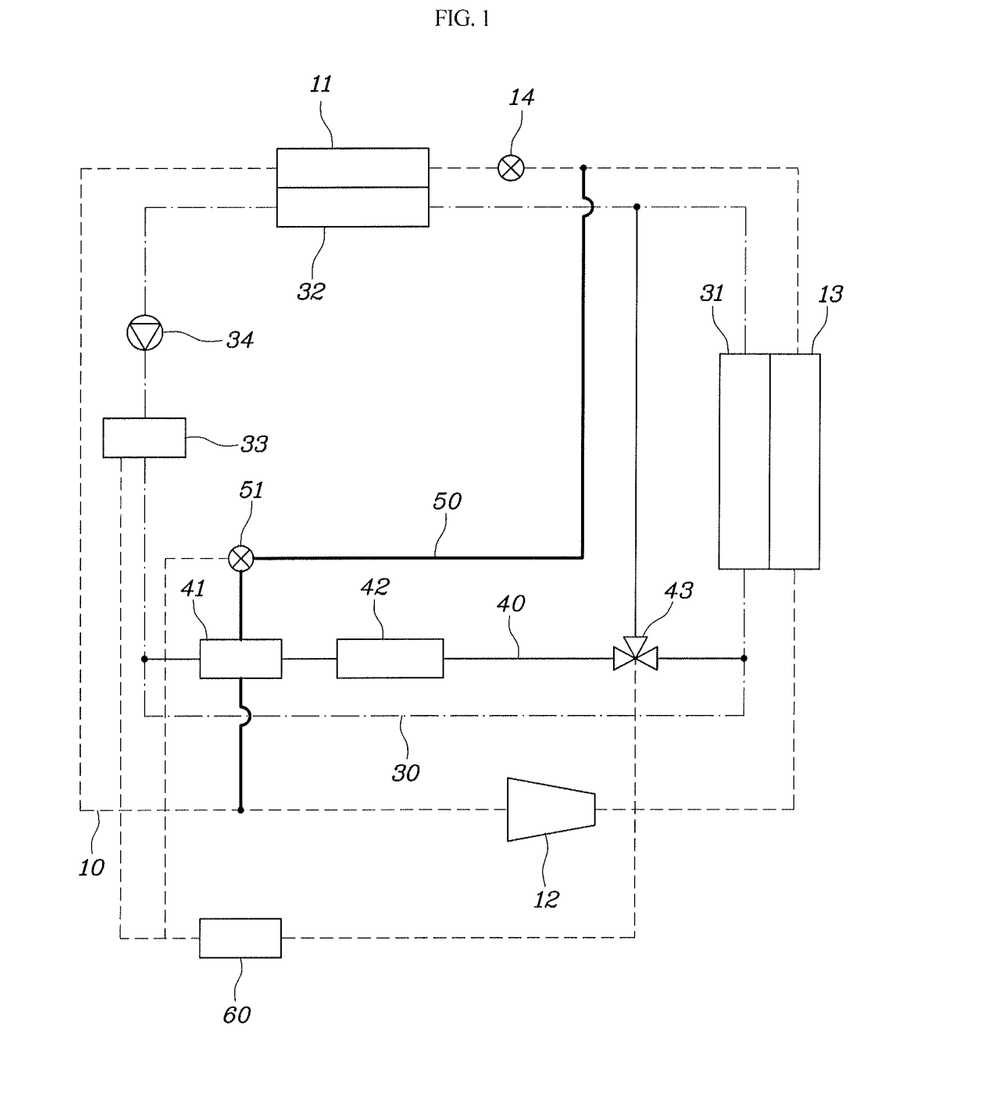
FIG. 1 is a circuit diagram of a heating, ventilating, and air conditioning (HVAC) system of a vehicle according to one exemplary embodiment of the present invention.
Figure 2:
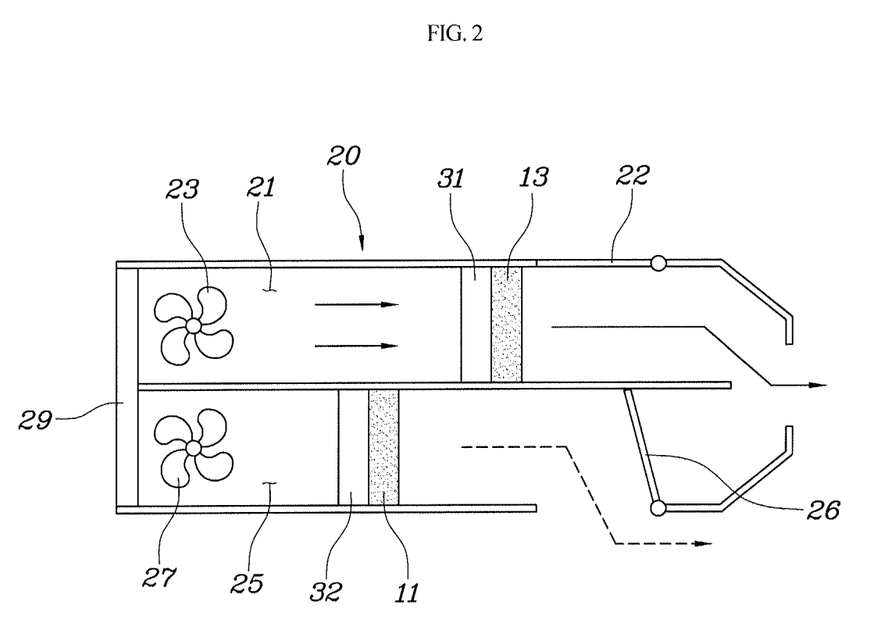
FIG. 2 is a diagram illustrating an indoor HVAC device of the HVAC system of a vehicle shown in FIG. 1 according to a first exemplary embodiment of the present invention.

As shown in FIGS. 1 to 2, the HVAC system of a vehicle according to the present invention may include a refrigerant line 10 including an evaporator 11, a compressor 12, and a condenser 13 and through which a refrigerant may circulate; an indoor HVAC device 20 in which the evaporator 11 and the condenser 13 may be disposed on an internal air flow path and by which air passing through the evaporator 11 or the condenser 13 may be discharged to an interior or an exterior of the vehicle through operation of a door; a first heat exchanger 31 disposed adjacent to the condenser 13 on the air flow path of the indoor HVAC device 20 and configured to perform heat exchange with the condenser 13; a second heat exchanger 32 disposed adjacent to the evaporator 11 on the air flow path of the indoor HVAC device 20 and configured to perform heat exchange with the evaporator 11; and a cooling water line 30 through which cooling water may circulate in the first heat exchanger 31 and the second heat exchanger 32.

More specifically, an expansion valve 14 may be disposed on the refrigerant line 10, a water heating heater 33 may be disposed on the cooling water line 30, the condenser 13 may be configured to exchange heat with the first heat exchanger 31, and the evaporator 11 may be configured to exchange heat with the second heat exchanger 32 to improve HVAC efficiency through heat transfer between the refrigerant circulating in the refrigerant line 10 and the cooling water circulating in the cooling water line 30. In other words, when heating or cooling the interior of the vehicle, heat exchange may be performed between the refrigerant of the refrigerant line 10 and the cooling water of the cooling water line 30 to adjust a temperature of the refrigerant Thus, even when a driving amount of the compressor 12 is not sufficiently secured, it may be possible to efficiently perform generation of heating air due to the condenser 13 or cooling air due to the evaporator 11.

In particular, in the HVAC system of a vehicle, the evaporator 11 and the condenser 13 may be disposed in the indoor HVAC device 20 to provide heating air and cooling air to the interior of the vehicle, and air passing through the evaporator 11 or the condenser 13 may be discharged to the interior or the exterior of the vehicle through operation of a door provided in the indoor HVAC device 20. In other words, the condenser 13 and the evaporator 11 may be disposed on the air flow path of the indoor HVAC device 20, and the heating air passing through the condenser 13 or the cooling air passing through the evaporator 11 may be discharged to the interior of the vehicle through the operation of the door. As described above, when the HVAC device with the refrigerant line 10 and the cooling water line 30 is disposed in an engine room, the air flow path of the indoor HVAC device 20 may be changed to direct the cooling or heating air to be introduced into the interior of the vehicle.

To describe the present invention in detail, as shown in FIG. 2, the indoor HVAC device 20 may include a first air flow path 21 in which the condenser 13 and the first heat exchanger 31 are disposed and a first door 22 through which air increased in temperature may flow by passing through the condenser 13. Additionally, the HVAC device 20 may include a second air flow path 25 in which the evaporator 11 and the second heat exchanger 32 are disposed and a second door 26 through which air being cooled may flow by passing through the evaporator 11.

As described above, the indoor HVAC device 20 may be divided into the first air flow path 21 and the second air flow path 25. The first air flow path 21 and the second air flow path 25 may be routed to the engine room and to allow air-conditioned air, of which temperature is adjusted through the condenser 13 and the evaporator 11, to be introduced into the interior of the vehicle. Particularly, the condenser 13 and the first heat exchanger 31 may be disposed on the first air flow path 21, the air may flow through a first blower 23, and the temperature-controlled air may be discharged to the interior or the exterior of the vehicle according to whether the first door 22 is opened or closed. The evaporator 11 and the second heat exchanger 32 may be disposed on the second air flow path 25, the air may flow through a second blower 27, and the temperature-controlled air may be discharged to the interior or the exterior of the vehicle according to whether the second door 26 is opened or closed. Further, a filter 29 may be disposed in the first air flow path 21 and the second air flow path 25 to prevent an inflow of impurities. Accordingly, heating air of which temperature is increased through the condenser 13 may flow in the first air flow path 21, and cooling air of which temperature decreases through the evaporator 11 may flow in the second air flow path 25.

The above-described indoor HVAC device 20 may be applied as various exemplary embodiments. For example, the condenser 13 and the first heat exchanger 31 may be disposed in the first air flow path 21, and the evaporator 11 and the second heat exchanger 32 may be disposed in the second air flow path 25. In other words, since the condenser 13 and the first heat exchanger 31 are disposed in the first air flow path 21, air passing through the first air flow path 21 is affected by the condenser 13 and the first heat exchanger 31 and thus, a temperature of the air may be adjusted, and, since the evaporator 11 and the second heat exchanger 32 are disposed in the second air flow path 25, air passing through the second air flow path 25 is affected by the evaporator 11 and the second heat exchanger 32 and thus, a temperature of the air may be adjusted.

Figure 3:
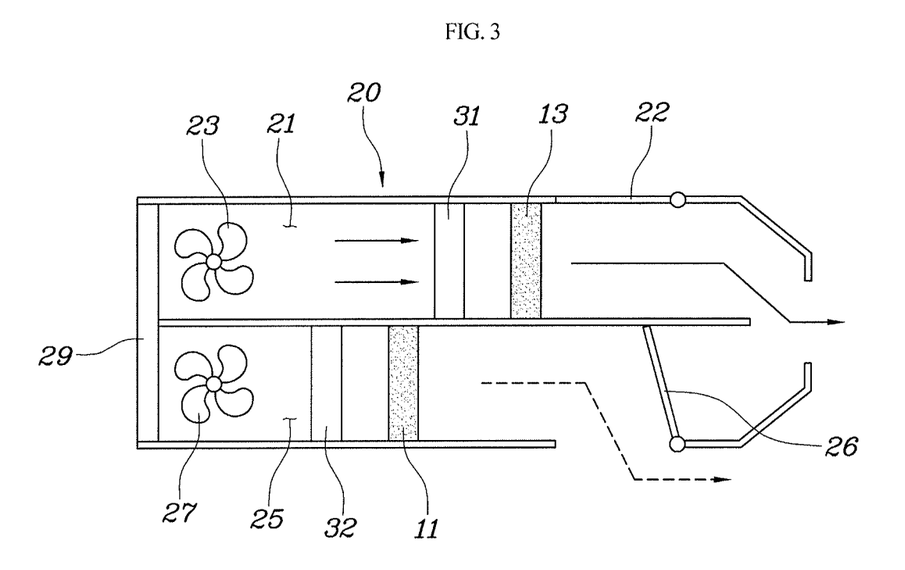
FIG. 3 is a diagram illustrating an indoor HVAC device of the HVAC system shown of a vehicle in FIG. 1 according to a second exemplary embodiment of the present invention.

Thus, as shown in FIG. 3, the condenser 13 and the first heat exchanger 31 may be disposed to cause air passing through the first air flow path 21 to pass through the first heat exchanger 31 and then pass the condenser 13 and the first heat exchanger 31 and the condenser 13 may be spaced apart from each other to allow convective heat transfer. The evaporator 11 and the second heat exchanger 32 may be disposed to cause air passing through the second air flow path 25 to pass the second heat exchanger 32 and then pass through the evaporator 11 and the second heat exchanger 32 and the evaporator 11 may be spaced apart from each other to allow convective heat transfer.

As described above, the condenser 13 and the first heat exchanger 31 are provided to be heat-exchangeable with each other and spaced apart from each other to allow convective heat transfer and thus, a degree of arrangement freedom with respect to the condenser 13 and the first heat exchanger 31 is secured in the first air flow path 21. Further, the condenser 11 and the second heat exchanger 32 are also spaced apart from each other to allow convective heat transfer and thus, a degree of arrangement freedom with respect to the condenser 11 and the second heat exchanger 32 is secured in the second air flow path 25. Further, the condenser 13 and the first heat exchanger 31, and the evaporator 11 and the second heat exchanger 32 may be disposed to be spaced apart to increase king efficiency due to ventilation of air.

Meanwhile, as shown in FIG. 2, the condenser 13 and the first heat exchanger 31 may be disposed to cause air passing through the first air flow path 21 to pass through the first heat exchanger 31 and then pass the condenser 13 and the condenser 13 and the first heat exchanger 31 may be in contact with each other to allow convective heat transfer. The evaporator 11 and the second heat exchanger 32 may be disposed to cause air passing through the second air flow path 25 to pass the second heat exchanger 32 and then pass through the evaporator 11 and the evaporator 11 and the second heat exchanger 32 may be in contact with each other to allow convective heat transfer.

As described above, the condenser 13 and the first heat exchanger 31 are in contact with each other, and the evaporator 11 and the second heat exchanger 32 are in contact with each other to allow the conductive heat transfer and thus, efficiency of thermal conductivity may be secured. Further, the air, which passes through the first air flow path 21 or the second air flow path 25, passes through the condenser 13 and the first heat exchanger 31 or passes through the evaporator 11 and the second heat exchanger 32 and thus, a temperature control amount of the air may be secured. In addition, the condenser 13 and the first heat exchanger 31 are in contact with each other, and the evaporator 11 and the second heat exchanger 32 are in contact with each other and thus, an overall size may be reduced and it is advantageous in layout.

Figure 4:
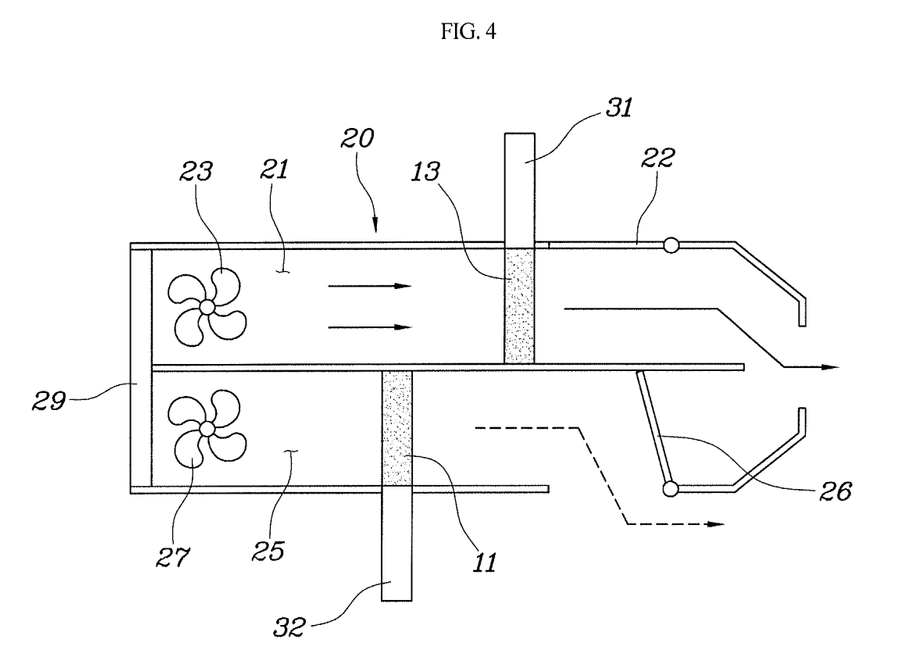
FIG. 4 is a diagram illustrating an indoor HVAC device of the HVAC system shown of a vehicle in FIG. 1 according to a third exemplary embodiment of the present invention.

Meanwhile, as another exemplary embodiment, as shown in FIG. 4, a condenser 13 may be disposed in a first air flow path 21, a first heat exchanger 31 may be configured to exchange heat with the condenser 13 outside the first air flow path 21, an evaporator 11 may be disposed in a second air flow path 25, and a second heat exchanger 32 may be configured to exchange heat with the evaporator 11 outside the second air flow path 25. Particularly, the condenser 13 may be in contact with the first heat exchanger 31 to allow conductive heat transfer, and the evaporator 11 may be in contact with the second heat exchanger 32 to allow conductive heat transfer and thus, the condenser 13 and the first heat exchanger 31 may be in contact with each other and the evaporator 11 and the second heat exchanger 32 may be in contact with each other to allow the conductive heat transfer and secure efficiency of heat conductivity.

In other words, only the condenser 13 is disposed in the first air flow path 21 and the first heat exchanger 31 may be configured to exchange heat with the condenser 13 outside the first air flow path 21 to cause air passing through the first air flow path 21 to be affected by the condenser 13 and thus a temperature of the air may be adjusted. Further, only the evaporator 11 is disposed in the second air flow path 25 and the second heat exchanger 32 may be configured to exchange heat with the evaporator 11 outside the second air flow path 25 to cause air passing through the second air flow path 25 to be affected by the evaporator 11 and thus a temperature of the air may be adjusted.

Thus, since only the condenser 13 may be configured to adjust the temperature of the air in the first air flow path 21, and only the evaporator 11 may be configured to adjust the temperature of the air in the second air flow path 25, temperature control of the heating or cooling air may be simplified. Further, a degree of arrangement freedom with respect to the first heat exchanger 31 and the second heat exchanger 32 may be secured.

Meanwhile, as shown in FIG. 1, a water heating heater 33 may be further disposed in the cooling water line 30 to adjust a temperature of the cooling water which circulates in the cooling water line 30. Further, a battery temperature increase line 40 may be further included which branches from the cooling water line 30 to the first heat exchanger 31 and the second heat exchanger 32 and may include a third heat exchanger 41, a battery 42, and a first valve 43 for switching a flow of the cooling water to the first heat exchanger 31 or the second heat exchanger 32.

In other words, the cooling water of the cooling water line 30 may circulate in the battery temperature increase line 40, and the third heat exchanger 41 and the battery 42 may be disposed in the battery temperature increase line 40 and affected by the cooling water to adjust a temperature of the battery 42. Further, the battery temperature increase line 40 branches and extends from the cooling water line 30 and then extends to branch to the first heat exchanger 31 and the second heat exchanger 32 again, and a flow of the cooling water may be switched by the first valve 43 to adjust the temperature of the battery 42 based on a path of the cooling water which circulates in the battery temperature increase line 40.

Additionally, a battery cooling line 50 may be further included having a second valve 51. The battery cooling line 50 branches from the refrigerant line 10 to be connected to the third heat exchanger 41 and to exchange heat therewith and configured to switch a flow of a refrigerant of the third heat exchanger 41. As described above, since the battery cooling line 50 may branch from the refrigerant line 10 and exchange heat with the third heat exchanger 41, heat exchange between the refrigerant circulating in the refrigerant line 10 and the cooling water circulating in the cooling water line 30 may be performed. Thus, the cooling water may be cooled through the refrigerant circulating in the refrigerant line 10, and the battery 42 may be cooled by the cooling water of which temperature decreases.

Accordingly, as shown in FIG. 1, the refrigerant line 10 including the evaporator 11, the compressor 12, the condenser 13, and the expansion valve 14, and the cooling water line 30 including the first heat exchanger 31, a water pump 34, the water heating heater 33, and the second heat exchanger 32 are provided. Particularly, in the cooling water line 30, a first end of the battery temperature increase line 40 may be connected after the water heating heater 33 and a second end of the battery temperature increase line 40 branches and extends to be connected to the first heat exchanger 31 and the second heat exchanger 32. In the refrigerant line 10, the battery cooling line 50 may have a first end connected before the compressor 12 and passes through the third heat exchanger 41 to be connected before the expansion valve 14. Consequently, it may be possible to implement various modes according to cooling, heating, temperature control of the battery 42. Particularly, the first heat exchanger 31 may include a heater core, the second heat exchanger 32 may include a core as a heat sink, and the third heat exchanger 41 may include a battery chiller.

The above-described control according to the present invention may be performed as follows.

Accordingly, a controller 60 may be further included and may be configured to determine (using a sensor) the temperature of the battery 42 and information regarding discharge temperature of indoor air and operate the water heating heater 33, the first valve 43, and the second valve 51 based on an operation mode due to the temperature of the battery 42 and the information regarding discharge temperature of the indoor air. The controller 60 may be configured to determine the temperature of the battery 42 and the information regarding discharge temperature of the indoor air using various temperature sensors.

The controller 60 according to an exemplary embodiment of the present invention may be implemented with a nonvolatile memory (not shown) configured to store data relating to an algorithm for controlling operations of various components of the vehicle or data relating to software commands for reproducing the algorithm, and a processor (not shown) configured to perform operations, which will be described below, using the data stored in the nonvolatile memory. Here, the nonvolatile memory and the processor may be implemented as separate chips. Alternatively, the nonvolatile memory and the processor may be implemented as a single chip integrated with each other. The processor may be in the form of one or more processors.

Meanwhile, opening and closing of the first door 22 and the second door 26 may be executed by the controller 60. In a heating mode, the controller 60 may be configured to open the first door 22 and close the second door 26, and in a cooling mode, the controller 60 may be configured to close the first door 22 and open the second door 26. To describe the operation of the controller 60 in detail, when the heating mode is performed, the controller 60 may be configured to operate the water heating heater 33 and close the first valve 43 and the second valve 51.

Figure 5:
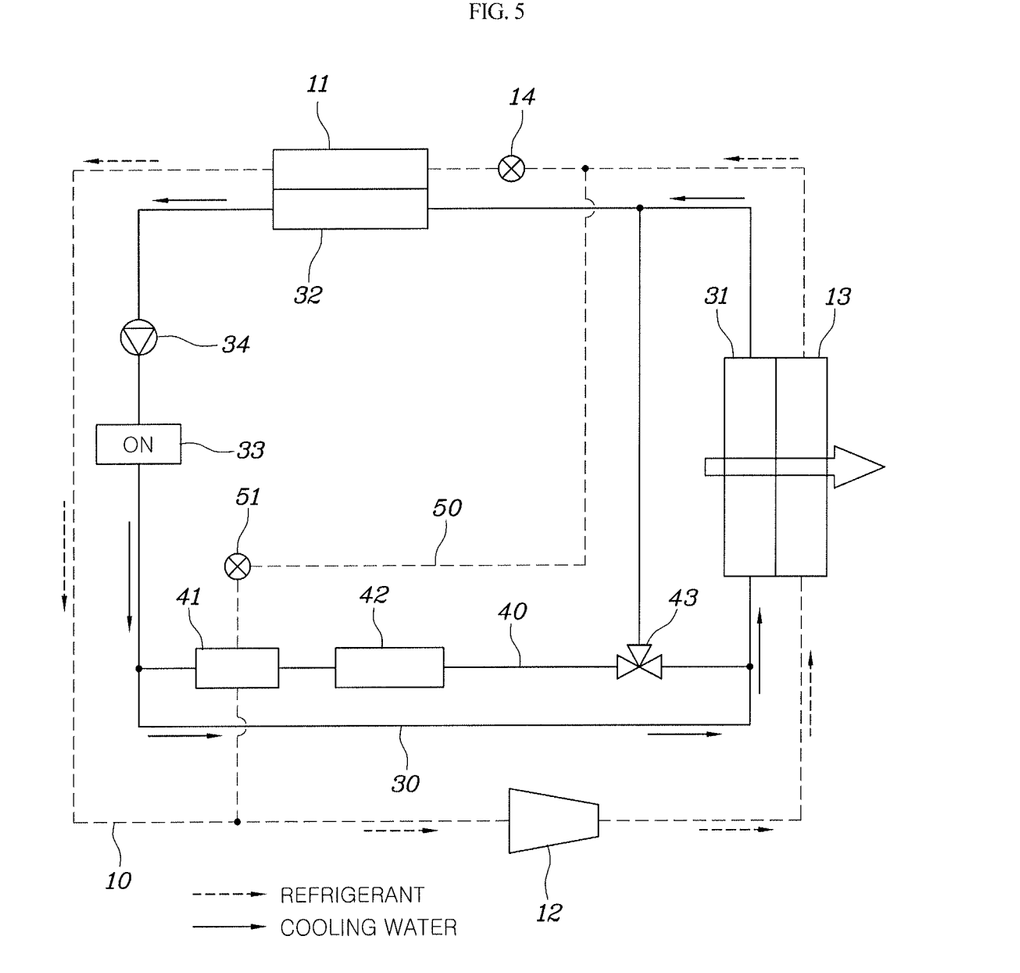
FIG. 5 is a diagram for describing a heating mode of the HVAC system of a vehicle shown in FIG. 1 according to one exemplary embodiment of the present invention.

In particular, the heating mode is a condition in which the heating air is discharged to the interior of the vehicle. As shown in FIG. 5, the controller 60 may be configured to operate the water heating heater 33 to increase a temperature of the cooling water in the cooling water line 30 and close the first valve 43 and the second valve 51, thereby preventing the temperature of the battery 42 from being affected. The water heating heater 33 may be operated as described above to circulate the cooling water having the increase temperature through the first heat exchanger 31 and the second heat exchanger 32. In other words, since the second heat exchanger 32 transfers heat through the evaporator 11 and thus a temperature of the refrigerant delivered to the compressor 12 is increased, the temperature of the refrigerant increased through the compressor 12 may be further increased. Consequently, a high temperature refrigerant is secured even in the condenser 13 and thus, a temperature increase of the air through the condenser 13 may be achieved more efficiently. In particular, the first door 22 of the indoor HVAC device 20 may be opened and the second door 26 thereof may be closed to discharge the heating air to the interior of the vehicle and discharge the cooling air to the exterior thereof.

Figure 6:
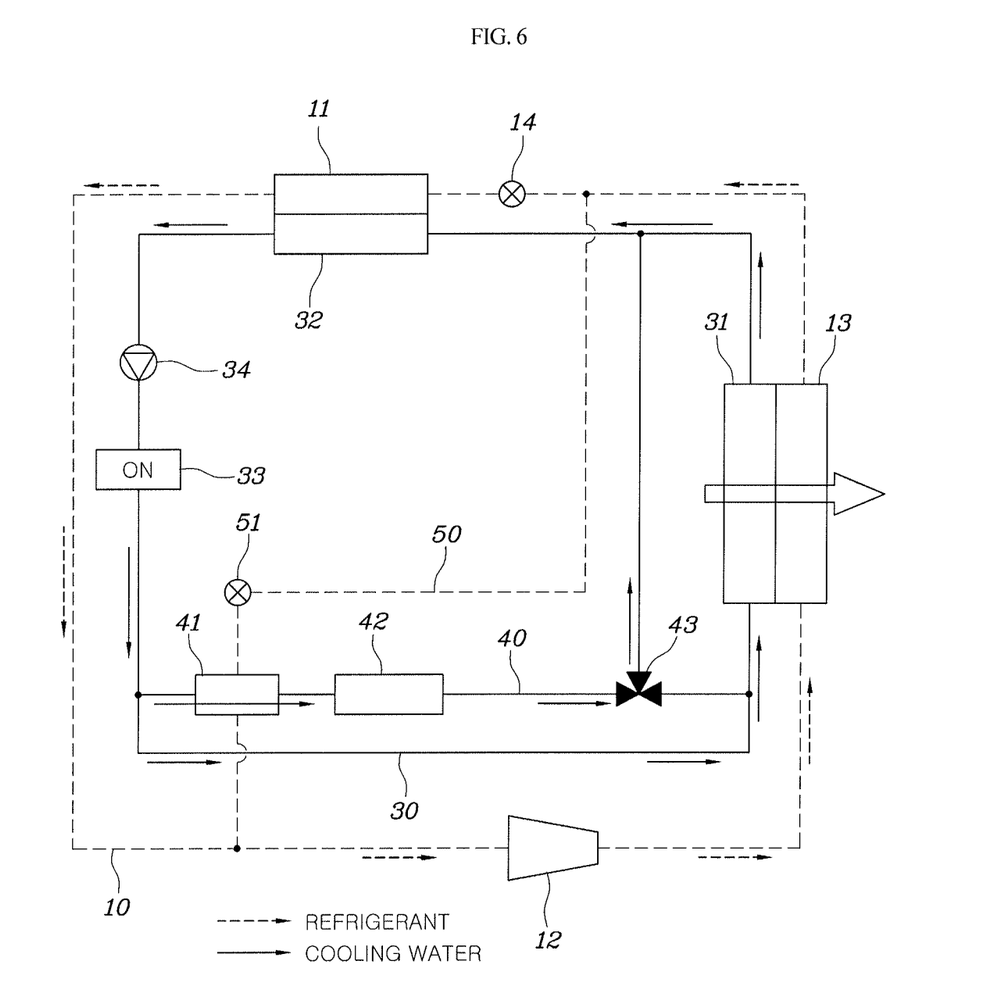
FIG. 6 is a diagram for describing a battery temperature increase mode of the HVAC system of a vehicle shown in FIG. 1 according to one exemplary embodiment of the present invention.

Meanwhile, when a battery temperature increase mode is performed, the controller 60 may be configured to operate the water heating heater 33, open the first valve 43 to allow the cooling water to move to the first heat exchanger 31 and the second heat exchanger 32, and close the second valve 51. Herein, the battery temperature increase mode is a condition in which a temperature increase of the battery 42 is required, such as an initial starting state. As shown in FIG. 6, the controller 60 may be configured to operate the water heating heater 33 to increase the temperature of the cooling water in the cooling water line 30 and open the first valve 43 to allow the cooling water to circulate in the battery temperature increase line 40, thereby increasing the temperature of the battery 42. In particular, since the first valve 43 allows the cooling water circulating in the battery temperature increase line 40 to circulate through both of the first heat exchanger 31 and the second heat exchanger 32, the battery temperature increase mode and the heating mode may be implemented simultaneously.

Particularly, when only the battery temperature increase mode is performed, the controller 60 be configured to close both the first door 22 and the second door 26 to discharge both the heating air and the cooling air to the exterior of the vehicle. When the heating mode is performed together with the battery temperature increase mode, the controller 60 may be configured to open the first door 22 to discharge the heating air to the interior of the vehicle.

Figure 7:
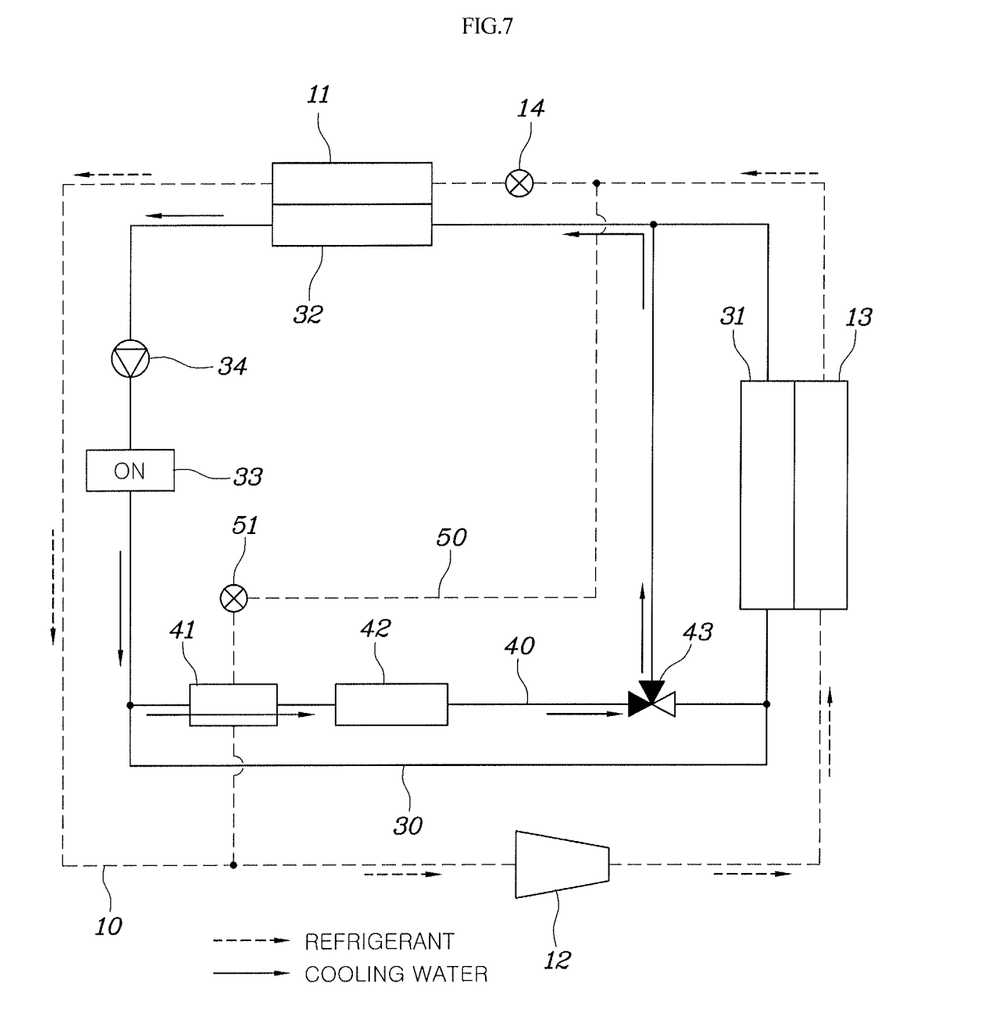
FIG. 7 is a diagram for describing a mild temperature increase mode of the HVAC system of a vehicle shown in FIG. 1 according to one exemplary embodiment of the present invention.

Meanwhile, when a mild temperature increase mode, of which temperature is less than that of the battery temperature increase mode, is performed, the controller 60 may be configured to operate the water heating heater 33, operate the first valve 43 to allow the cooling water to move to the second heat exchanger 32, and close the second valve 51. Herein, the mild temperature increase mode is a condition in which the temperature of the battery 42 is increased to some extent. As shown in FIG. 7, the controller 60 may be configured to operate the water heating heater 33 to increase the temperature of the cooling water and open the first valve 43 to allow the cooling water to flow to the battery 42, thereby increasing the temperature of the battery 42.

Further, since the cooling water does not pass through the first heat exchanger 31 and thus the condenser 13 does not lose heat through the first heat exchanger 31, and the second heat exchanger 32 transfers heat of the cooling water through the evaporator 11 and thus a temperature of the refrigerant delivered to the compressor 12 is increased, the temperature of the refrigerant increased through the compressor 12 may be further increased. Consequently, a high temperature refrigerant is secured even in the condenser 13 and thus, a temperature increased of the air through the condenser 13 may be achieved more efficiently. In other words, performance of a heat pump may be maximized to increase temperature of the heating air.

Figure 8:
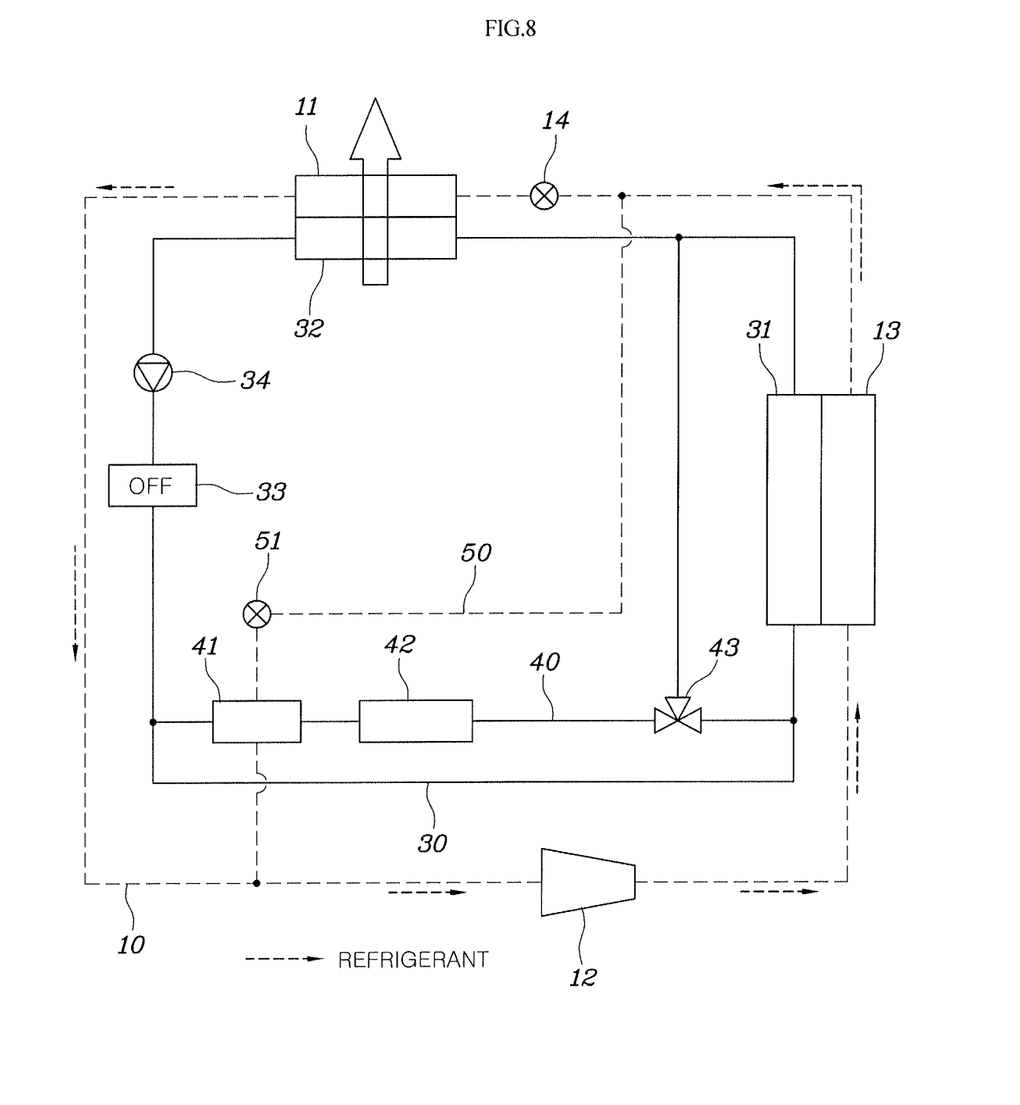
FIG. 8 is a diagram for describing a cooling mode of the HVAC system of a vehicle shown in FIG. 1 according to one exemplary embodiment of the present invention.

Meanwhile, in the cooling mode, the controller 60 may be configured to stop operation of the water heating heater 33 and close the first valve 43 and the second valve 51. In particular, the cooling mode is a condition in which the cooling air is discharged to the interior of the vehicle. As shown in FIG. 8, the controller 60 be configured to stop operation of the water heating heater 33 and close the first valve 43 and the second valve 51, thereby preventing the temperature of the battery 42 from being affected. In particular, when the temperature of the refrigerant circulating in the refrigerant line 10 is decreased through the condenser 13, as the first heat exchanger 31 absorbs the heat of the condenser 13, the temperature of the refrigerant is further decreased and, as the second heat exchanger 32 absorbs the heat of the evaporator 11, generation efficiency of the cooling air through the evaporator 11 increases.

As described above, the first heat exchanger 31 coupled to the condenser 13 may be utilized to generate an effect in which a heat dissipation area of the condenser 13 is increased to improve cooling performance. In particular, the first door 22 of the indoor HVAC device 20 may be closed and the second door 26 thereof may be opened to discharge the cooling air to the interior of the vehicle and to discharge the heating air to the exterior thereof.

Figure 9:
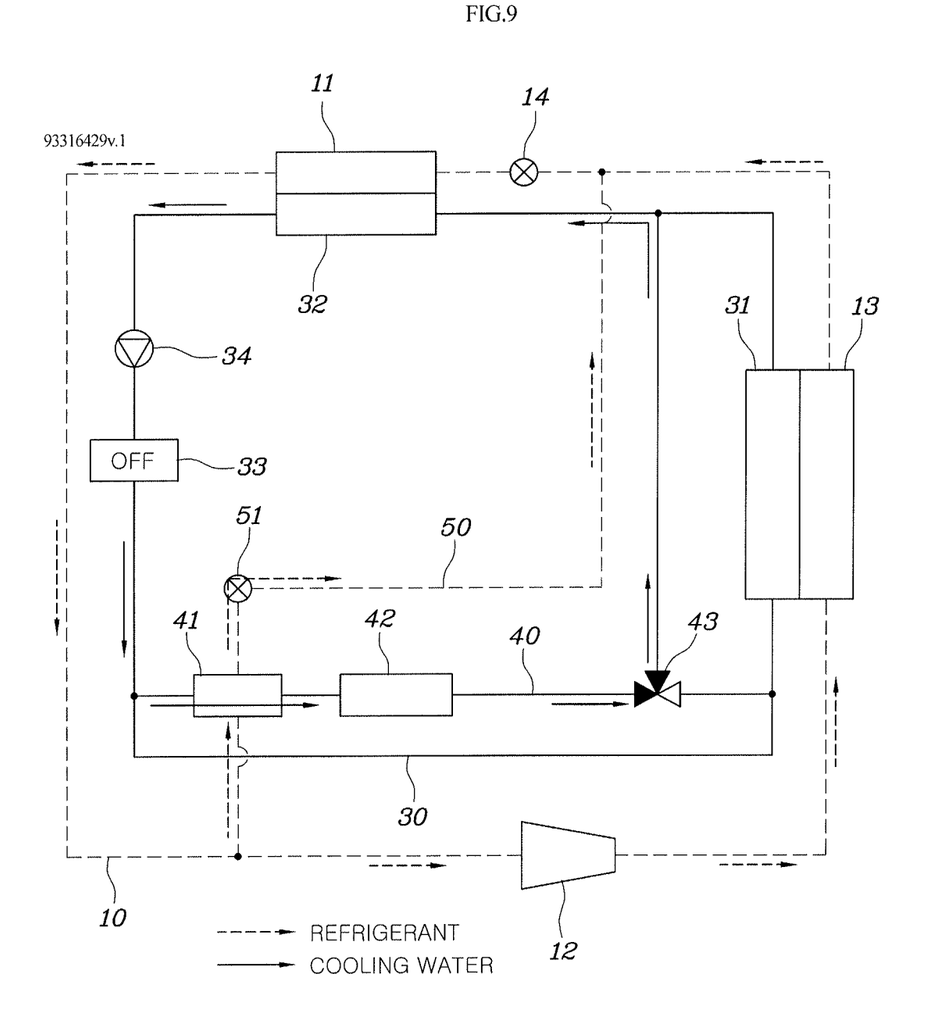
FIG. 9 is a diagram for describing a battery cooling mode of the HVAC system of a vehicle shown in FIG. 1 according to one exemplary embodiment of the present invention.

Meanwhile, when a battery cooling mode is performed, the controller 60 may be configured to stop operation of the water heating heater 33, open the first valve 43 to allow the cooling water to move to the second heat exchanger 32, and open the second valve 51. In particular, the battery cooling mode is a condition in which cooling of the battery 42 is required. As shown in FIG. 9, the controller 60 may be configured to stop operation of the water heating heater 33, open the first valve 43 to allow the cooling water to circulate in the battery temperature increase line 40, and open the second valve 51, thereby allowing heat exchange between the third heat exchanger 41 and the refrigerant.

In other words, as the second valve 51 is opened, the refrigerant of which temperature is decreased while passing through the evaporator 11 in the refrigerant line 10 moves to the third heat exchanger 41 through the battery cooling line 50, and the cooling water in the cooling water line 30 exchanges heat with the refrigerant through the third heat exchanger 41 and thus, the temperature of the refrigerant is decreased. As described above, the temperature-dropped cooling water circulates through the cooling water line 30 to be supplied to the battery 42 and thus, cooling of the battery 42 may be performed. In particular, the first valve 43 may be opened and the cooling water may circulate through only the second heat exchanger 32 and thus, the temperature of the cooling water may be prevented from increasing through the first heat exchanger 31 which absorbs heat.

The HVAC system of a vehicle, which is configured in the above-described structure, replaces a cooling water circuit having a complex configuration and a separate heat pump system for recovering waste heat of an electric vehicle by changing an air flow path for supplying heating and cooling air and secures an indoor space by disposing an HVAC in an engine room. Therefore, a production cost and a weight may be decreased by avoiding a complicated cooling line and minimizing a valve configuration.

While the specific exemplary embodiments of the present invention have been described in detail, it is obvious to those skilled in the art that various modifications and alternations can be made without departing from the technical spirit and scope of the present invention and these modifications and alternations fall within the scope of the appended claims.

What is claimed is:

1. A heating, ventilating, and air conditioning (HVAC) system of a vehicle, comprising:
    a refrigerant line which includes an evaporator, a compressor, and a condenser and through which a refrigerant circulates;
    an indoor HVAC device in which the evaporator and the condenser are disposed on an internal air flow path, and air passing through the evaporator or the condenser is discharged to an interior or an exterior of the vehicle through operation of a door;
    a first heat exchanger disposed adjacent to the condenser on the internal air flow path of the indoor HVAC device and configured to exchange heat with the condenser;
    a second heat exchanger disposed adjacent to the evaporator on the internal air flow path of the indoor HVAC device and configured to exchange heat with the evaporator; and
    a cooling water line configured to allow cooling water to circulate through the first heat exchanger and the second heat exchanger,
    wherein the indoor HVAC device includes:
        a first air flow path in which the condenser and the first heat exchanger are disposed and a first door is through which air increased in temperature while passing through the condenser circulates, wherein the first door is disposed in the first air flow path; and
        a second air flow path in which the evaporator and the second heat exchanger are disposed and a second door through which air cooled while passing through the evaporator circulates, wherein the second door is disposed in the second air flow path;
    wherein opening and closing of the first door and the second door is executed by the controller and, when a heating mode is performed, the controller is configured to open the first door and close the second door and, when a cooling mode is performed, the controller is configured to close the first door and to open the second door.

2. The HVAC system of claim 1, wherein:
    the condenser and first heat exchanger are disposed to allow air passing through the first air flow path to pass through the condenser after the first heat exchanger and are spaced apart from each other to allow convective heat transfer; and
    the evaporator and second heat exchanger are disposed to allow air passing through the second air flow path to pass through the evaporator after the second heat exchanger and are spaced apart from each other to allow convective heat transfer.

3. The HVAC system of claim 1, wherein:
    the condenser and first heat exchanger are disposed to allow air passing through the first air flow path to pass through the condenser after the first heat exchanger and are in contact with each other to allow conductive heat transfer; and
    the evaporator and second heat exchanger are disposed to allow air passing through the second air flow path to pass through the evaporator after the second heat exchanger and are in contact with each other to allow conductive heat transfer.

4. The HVAC system of claim 1, wherein:
    the condenser is disposed in the first air flow path, and the first heat exchanger is configured to exchange heat with the condenser outside the first air flow path; and
    the evaporator is disposed inside the second air flow path and the second heat exchanger is configured to exchange heat with the evaporator outside the second air flow path.

5. The HVAC system of claim 4, wherein the condenser is in contact with the first heat exchanger to allow conductive heat transfer, and the evaporator is in contact with the second heat exchanger to allow conductive heat transfer.

6. The HVAC system of claim 1, wherein a water heating heater is included in the cooling water line and wherein the HVAC system further includes a battery temperature increase line that branches from the cooling water line to the first heat exchanger and the second heat exchanger and including a third heat exchanger, a battery, and a first valve configured to switch a flow of the cooling water of the first heat exchanger or the second heat exchanger.

7. The HVAC system of claim 6, further comprising:
    a battery cooling line that branches from the refrigerant line and connected to the third heat exchanger to exchange heat therewith and including a second valve configured to switch a flow of the refrigerant of the third heat exchanger.

8. The HVAC system of claim 7, further comprising:
    a controller configured to determine a temperature of the battery and information regarding a discharge temperature of indoor air and operate the water heating heater, the first valve, and the second valve based on an operation mode due to the temperature of the battery and the information regarding the discharge temperature of the indoor air.

9. The HVAC system of claim 7, wherein, when a heating mode is performed, the controller is configured to operate the water heating heater to operate and close the first valve and the second valve.

10. The HVAC system of claim 7, wherein, when a battery temperature increase mode is performed, the controller is configured to operate the water heating heater, open the first valve to allow the cooling water to move to the first heat exchanger and the second heat exchanger, and close the second valve.

11. The HVAC system of claim 10, wherein, when a mild temperature increase mode, of which temperature is less than that of the battery temperature increase mode, is performed, the controller is configured to operate the water heating heater, open the first valve to allow the cooling water to move to the second heat exchanger, and close the second valve.

12. The HVAC system of claim 7, wherein, when a cooling mode is performed, the controller is configured to stop operation the water heating heater and close the first valve and the second valve.

13. The HVAC system of claim 7, wherein, when a battery cooling mode is performed, the controller is configured to stop operation of the water heating heater, open the first valve to allow the cooling water to move to the second heat exchanger, and open the second valve.

\* \* \* \* \*